April 30, 1957 — C. VERPLANK — 2,790,469
AUXILIARY TOOL ATTACHMENT FOR CIRCULAR SAWING MACHINES
Filed Jan. 18, 1956 — 3 Sheets-Sheet 1

Inventor
Christian Verplank
Attorney

April 30, 1957   C. VERPLANK   2,790,469
AUXILIARY TOOL ATTACHMENT FOR CIRCULAR SAWING MACHINES
Filed Jan. 18, 1956   3 Sheets-Sheet 3

Inventor
Christian Verplank
Attorney

United States Patent Office 2,790,469
Patented Apr. 30, 1957

2,790,469

AUXILIARY TOOL ATTACHMENT FOR CIRCULAR SAWING MACHINES

Christian Verplank, Holland, Mich.

Application January 18, 1956, Serial No. 559,935

6 Claims. (Cl. 144—1)

This invention provides an attachment for a conventional circular sawing machine. With this device, it is possible to do horizontal boring, routing, machine-carving, and practically any operation involving a rotary tool mounted on an axis adjacent to the plane of a work table and parallel to it. Boring holes in the edges of boards for receiving dowels is a very frequent task in the art of woodworking, and is performed with exceptional ease and accuracy through the use of this invention.

A very practical problem arises the moment a machine designer attempts to mount a spindle for rotation on an axis closely adjacent to a work table. Not only the shaft itself and its associated structure, but also the bearings and the supporting brackets have a tendency to interfere with the material of the table. This invention utilizes the cut-out area conventionally provided in the central portion of the work table of a circular sawing machine for accommodating a shaft and its supports so that the axis of rotation of the shaft can be brought down into the plane of the work table, if desired. The dimensions of the conventional table cut-out of the circular saw are inadequate to accommodate a shaft arranged parallel with the saw arbor. The cut-out is normally elongated in a direction transverse with respect to the saw arbor, and provides room for a shaft mounted on an axis disposed in a plane perpendicular to the axis of the saw arbor. Since power is most conveniently supplied from the existing arbor with a belt drive, some sort of power transfer system has to be used in which a pulley can be mounted above the saw arbor and on an axis parallel to it. This arrangement eliminates the possibility of driving the tool shaft of the attachment directly from the existing saw arbor.

The problem of driving the tool shaft has been solved by this invention through the provision of a second shaft disposed above the working tool shaft, and in a plane perpendicular to the axis thereof. This auxiliary driving shaft is also parallel to the plane of the work table, with the result that it is parallel to the axis of the existing saw arbor. This relative arrangement permits a pulley to be mounted on the auxiliary driving shaft, and also one on the main saw arbor, which are directly one above the other. A belt (preferably a V-belt) connects these pulleys and traverses the opening in the saw table. A power transfer system preferably involving intermeshed gears places the tool shaft and the auxiliary driving shaft in driving relationship. With the tool shaft driven from above, so to speak, it is free to function within the confines of the table cut-out.

The several features of this invention will be analyzed in detail through a discussion of the particular embodiments illustrated in the accompanying drawings. In the drawings.

Figure 1 presents a view in side elevation of a circular sawing machine with an attachment embodying this invention mounted in working position.

Figure 1:
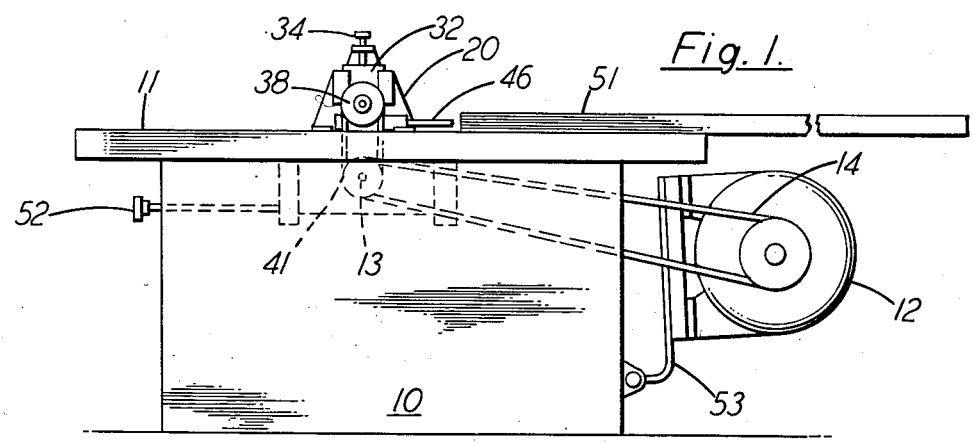
Figure 2:
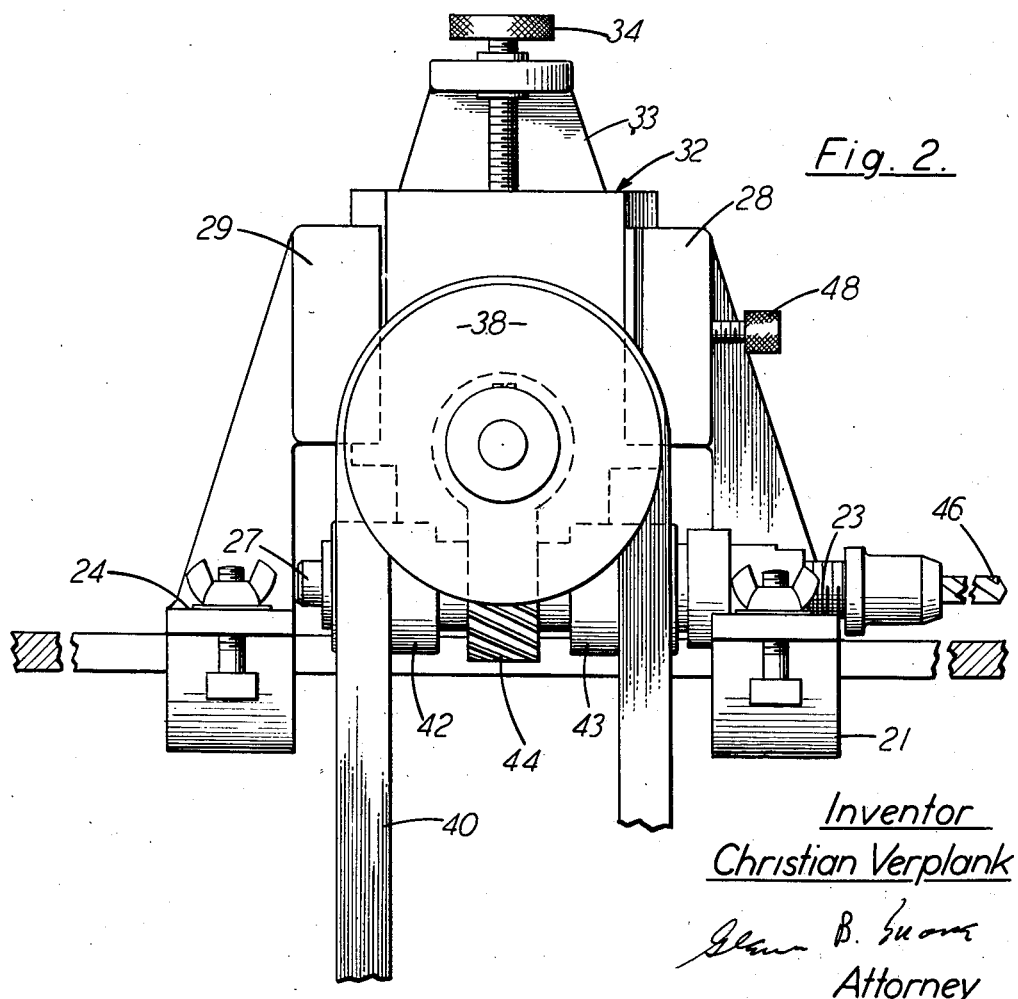
Figure 2 is a view on an enlarged scale taken in elevation in a direction perendicular to the axis of the main saw arbor.

Referring to the drawings, a sawing machine having a base 10 and a work table 11 is provided with a motor 12 which drives a saw arbor 13 through the belt 14. Normally, the arbor 13 provides a mounting for a circular, or disc-shaped saw (not shown), which works within the opening 15 in the table 11. The cut-out 15 is usually covered by a plate 16 having a narrow slot 17 through which the saw projects. (Refer to Figure 5.) The larger opening 15 gives access to the saw for removal of the same from the arbor. The cover 16 is conventionally held in position by screws (not shown) engaging the holes 18 and 19 in the table 11.

Figure 3:
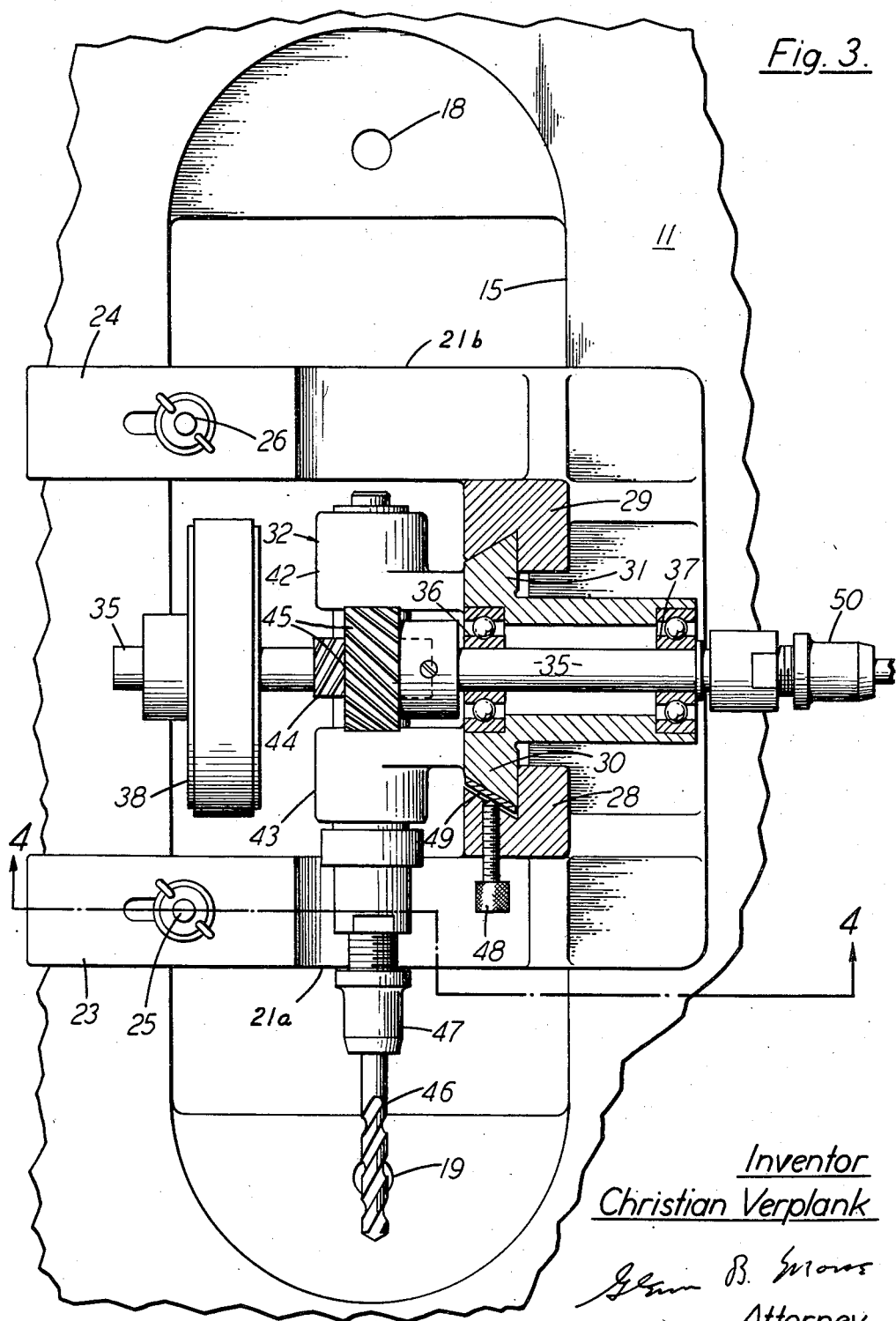
Figure 3 is a plan view, partially in section, and on the same scale as that of Figure 2.
Figure 4:
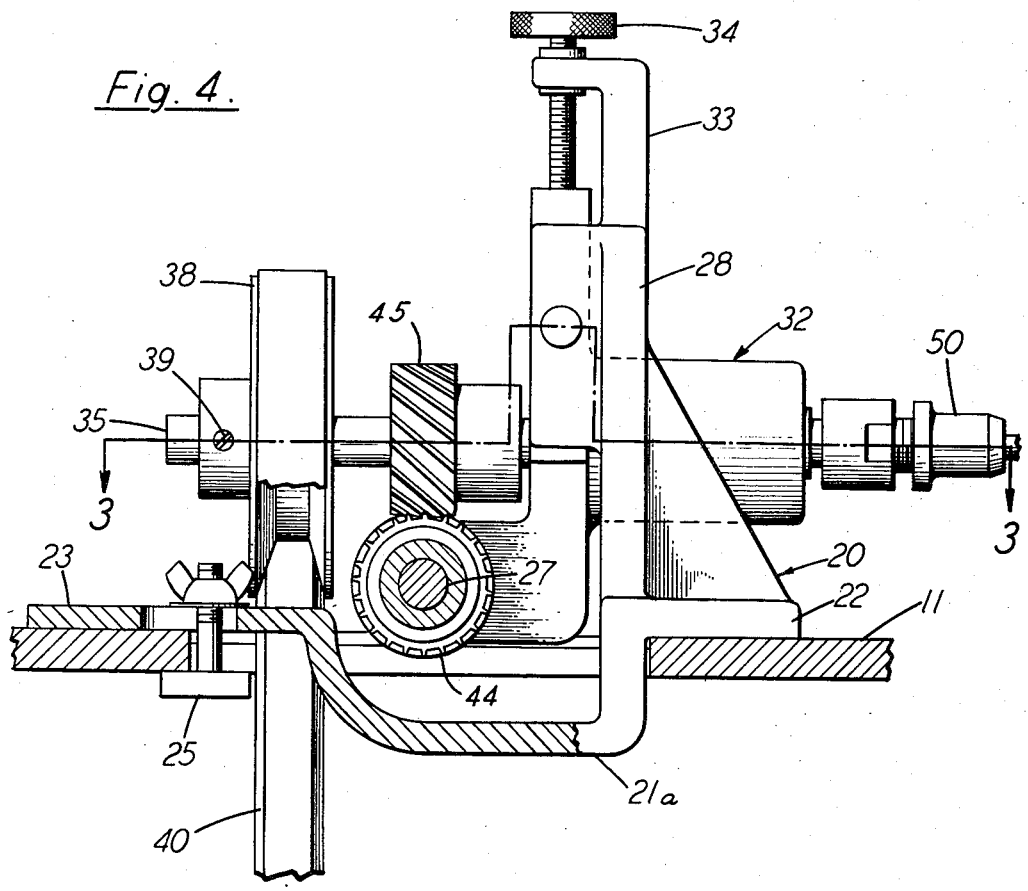
Figure 4 is a section taken on the plane 4—4 of Figure 3.

Referring particularly to Figures 3 and 4, the attachment itself includes a frame 20 preferably provided with underslung portions 21a and 21b received within the opening 15 in the table 11. A base flange 22 and extensions 23 and 24 provide mounting surfaces which normally rest on the surface of the table 11, and are held there by the action of the clamping bolt and nut assemblies 25 and 26. The underslung portions 21a and 21b of the frame eliminate the need of overhead structure above the shaft 27 to span the opening 15, and thereby render the spindle more accessible for adjustment.

The frame 20 is provided with vertical guideways 28 and 29 which respectively receive the mating portions 30 and 31 of a slide member generally indicated at 32. A vertical extension 33 on the frame acts as a mounting bracket for the adjusting screw 34, which engages the sliding member 32 and thereby determines the vertical relationship of the sliding member within the guideways.

A shaft 35 is mounted in the bearings 36 and 37, the outer races of which are fixed with respect to the sliding member 32. A pulley 38 is secured to the shaft 35 by adjustment of the set screw 39, and is driven by a belt 40 extending from a similar pulley 41 on the main saw arbor.

The shaft 27 is also mounted in bearings 42 and 43 which are also fixed with respect to the sliding member 32, with the shafts 27 and 35 being in mutually perpendicular planes and horizontal. The intermeshed gears 44 and 45 on shafts 27 and 35, respectively, operate as a power transfer for driving the tool 46 held in the collet (or other tool-gripping device) 47. Adjustment of the screw 34 will serve to position the axis of rotation of the tool 46 as close as may be desired to the plane of the table surface 11. The resistance to movement of the sliding member 32 along the guideways can be adjusted through manipulation of the screw 48 which bears against a plate 49 to determine the tightness of the frictional engagement between the guideways and the sliding member 32.

In many instances, it is also desirable to have a tool mounted on the higher shaft 35, and an additional collet 50 may be provided as shown for this purpose. The elevation of this shaft makes possible the use of the collet 50 for minor grinding or polishing operations, or it may be desirable to fit a small disc-shaped saw at this end of the shaft operating in overhead relationship above the table 11 to preserve the sawing characteristics of the machine while the attachment is installed.

Figure 5:
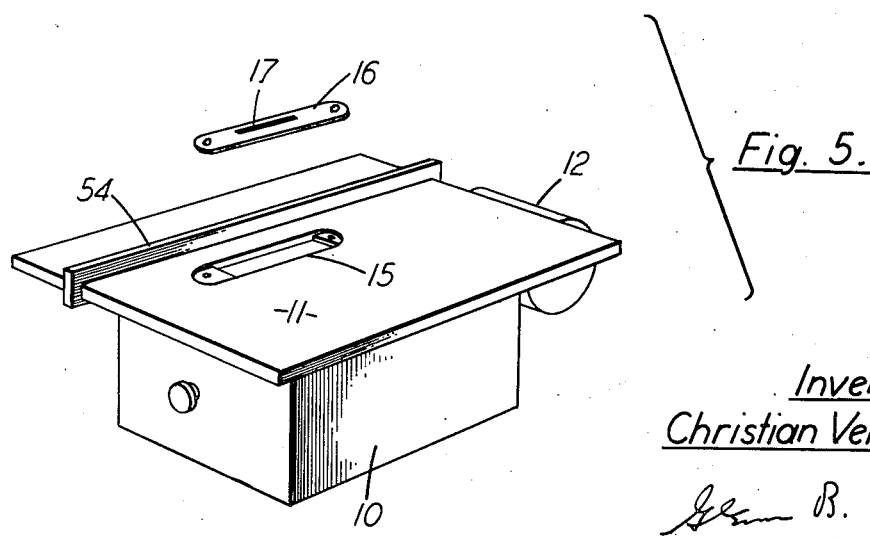
Figure 5 is a perspective view of the sawing machine shown prior to the installation of the subject attachment.

The degree of cooperation between the attachment described above and the conventional circular sawing machine is illustrated in Figure 1. Due to the dimensions of the workpiece 51, a relatively large table area is necessary to properly control the position of the workpiece with respect to the cutter 46. The vertical adjustment of the shaft 35 resulting from the manipulation of the screw 34 is accommodated without interfering with proper belt tension by the conventional adjusting mechanism generally indicated at 52 which positions the saw arbor with respect to the table surface. Since the motor 12 is mounted on a yieldable bracket 53, the adjustment 52 may be positioned as desired to create the necessary belt tension after the vertical adjustment at the screw 34 has been made. Reference to Figure 5 will establish that the conventional "fence" 54 provided on circular sawing machines as a guide for positioning pieces moving past the saw is also valuable in conjunction with the attachment. The "fence" 54 moves in a direction perpendicular to the shaft 27, and is maintained in a plane substantially parallel thereto at all times. It therefore becomes possible to move workpieces through the manipulation of the fence adjustment and thereby maintain a parallel relationship between the base of the workpiece which engages the fence and the axis of the cutting tool.

The particular embodiments of the present invention which have been illustrated and discussed herein are for illustrative purposes only and are not to be considered as a limitation upon the scope of the appended claims. In these claims, it is my intent to claim the entire invention disclosed herein, except as I am limited by the prior art.

I claim:

1. An attachment for a sawing machine, said machine having a table provided with an opening, and also having a spindle rotatably mounted below said opening on an axis substantially parallel to the surface of said table, said attachment comprising; frame means having a mounting surface for engagement with the surface of said table; clamping means disposed to engage said table at the edge of said opening to secure said frame means with respect to said sawing machine; vertical guideway means on said frame means; a slide member mounted on said guideway means for movement thereon; locating means for determining the position of said sliding member along said guideway means; a first shaft mounted for rotation on an axis fixed with respect to said slide member and parallel to said mounting surface; pulley means mounted on said first shaft and normally disposed opposite said opening; a second shaft, said second shaft including tool-gripping means, and being mounted for rotation on an axis fixed with respect to said slide member and disposed transversely with respect to and underneath said first shaft, said second shaft and the mounting thereof being at least partially receivable within said opening, and said frame means having a portion disposed underneath said second shaft and also normally receivable within said opening; and power-transfer means including intermeshed gears establishing a driving relationship between said first and second shafts.

2. An attachment for a sawing machine, said machine having a table provided with an opening, and also having a spindle rotatably mounted below said opening on an axis substantially parallel to the surface of said table, said attachment comprising; frame means having a mounting surface for engagement with the surface of said table; clamping means disposed to engage said table at the edge of said opening to secure said frame means with respect to said sawing machine; vertical guideway means on said frame means; a slide member mounted on said guideway means for movement thereon; locating means for determining the position of said sliding member along said guideway means; a first shaft mounted for rotation on an axis fixed with respect to said slide member and parallel to said mounting surface; pulley means mounted on said first shaft and normally disposed opposite said opening; a second shaft, said second shaft including tool-gripping means, and being mounted for rotation on an axis fixed with respect to said slide member and disposed transversely with respect to and underneath said first shaft, said second shaft and the mounting thereof being at least partially receivable within said opening, and said frame means having a portion disposed underneath said second shaft and also normally receivable within said opening; and power-transfer means establishing a driving relationship between said first and second shafts.

3. An attachment for a sawing machine, said machine having a table provided with an opening, and also having a spindle rotatably mounted below said opening on an axis substantially parallel to the surface of said table, said attachment comprising; frame means having a mounting surface for engagement with the surface of said table; clamping means disposed to engage said table at the edge of said opening to secure said frame means with respect to said sawing machine; a first shaft mounted for rotation on an axis fixed with respect to said frame means and parallel to said mounting surface; pulley means mounted on said first shaft and normally disposed opposite said opening; a second shaft, said second shaft including a tool-gripping means, and being mounted for rotation on an axis normally fixed with respect to said frame means and disposed transversely with respect to and underneath said first shaft, said second shaft and the mounting thereof being at least partially receivable within said opening, and said frame means having a portion disposed underneath said second shaft and also normally receivable within said opening; and power-transfer means establishing a driving relationship between said first and second shafts.

4. An attachment for a machine, said machine having a table provided with an opening, and also having a spindle rotatably mounted below said opening on an axis substantially parallel to the surface of said table, said attachment comprising; frame means having a mounting surface for engagement with the surface of said table; clamping means disposed to engage said table to secure said frame means with respect to said machine; a first shaft mounted for rotation on an axis normally fixed with respect to said frame means and parallel to said mounting surface; pulley means mounted on said first shaft and normally disposed opposite said opening; a second shaft, said second shaft including tool-gripping means, and being mounted for rotation on an axis normally fixed with respect to said frame means and disposed transversely with respect to and underneath said first shaft, said second shaft and the mounting thereof being at least partially receivable within said opening, and said frame means having a portion disposed underneath said second shaft and also normally receivable within said opening; and power-transfer means establishing a driving relationship between said first and second shafts.

5. An attachment for a machine, said machine having a table provided with an opening, and also having a spindle rotatably mounted below said opening on an axis substantially parallel to the surface of said table, said attachment comprising; frame means having a mounting surface for engagement with the surface of said table; clamping means disposed to engage said table to secure said frame means with respect to said machine; a first shaft mounted for rotation on an axis normally fixed with respect to said frame means and parallel to said mounting surface; pulley means mounted on said first shaft and normally disposed opposite said opening; a second shaft, said second shaft including tool-gripping means, and being mounted for rotation on an axis normally fixed with respect to said frame means and disposed transversely with respect to and underneath said first shaft, said second shaft and the mounting thereof being at least partially receivable within said opening; and power-transfer means establishing a driving relationship between said first and second shafts.

6. An attachment for a machine, said machine having a table provided with an opening, and also having a spindle rotatably mounted below said opening on an axis substantially parallel to the surface of said table, said attachment comprising; frame means having a mounting surface for engagement with the surface of said table; clamping means disposed to engage said table to secure said frame means with respect to said machine; a first shaft mounted for rotation on an axis normally fixed with respect to said frame means and parallel to said mounting surface; pulley means mounted on said first shaft and normally disposed opposite said opening; a second shaft, said second shaft including tool-gripping means, and being mounted for rotation on an axis normally fixed with respect to said frame means and disposed transversely with respect to said first shaft, said second shaft and the mounting thereof being at least partially receivable within said opening; and power-transfer means establishing a driving relationship between said first and second shafts.

References Cited in the file of this patent

UNITED STATES PATENTS

| | | |
|---|---|---|
| 448,195 | Barnes | Mar. 17, 1891 |
| 1,663,486 | Wertz | Mar. 20, 1928 |
| 2,016,528 | Wilson | Oct. 8, 1935 |